(12) United States Patent
Cucchi

(10) Patent No.: US 10,518,333 B2
(45) Date of Patent: Dec. 31, 2019

(54) DEVICE AND METHOD FOR RECOVERING AND UNLOADING BAR CROP ENDS FROM A MACHINE TOOL

(71) Applicant: CUCCHI GIOVANNI & C. S.R.L., Bussero (IT)

(72) Inventor: Cesare Cucchi, Bussero (IT)

(73) Assignee: Cucchi Giovanni & C. S.r.l. (IT)

( * ) Notice: Subject to any disclaimer, the term of this patent is extended or adjusted under 35 U.S.C. 154(b) by 0 days.

(21) Appl. No.: 15/777,684

(22) PCT Filed: Nov. 23, 2016

(86) PCT No.: PCT/EP2016/078573
§ 371 (c)(1),
(2) Date: May 21, 2018

(87) PCT Pub. No.: WO2017/089409
PCT Pub. Date: Jun. 1, 2017

(65) Prior Publication Data
US 2018/0369922 A1    Dec. 27, 2018

(30) Foreign Application Priority Data

Nov. 24, 2015 (IT) .......................... UB2015A005834

(51) Int. Cl.
*B23B 13/12* (2006.01)
(52) U.S. Cl.
CPC .................. *B23B 13/128* (2013.01)
(58) Field of Classification Search
CPC ............................ B23B 13/123; B23B 13/128
See application file for complete search history.

(56) References Cited

U.S. PATENT DOCUMENTS

| 2,426,200 | A | 8/1947 | Green |
| 4,708,039 | A | 11/1987 | Redman |
| 2012/0186407 | A1* | 7/2012 | Nakaya ................. B23B 13/02 82/124 |
| 2014/0083263 | A1 | 3/2014 | Geiser |

FOREIGN PATENT DOCUMENTS

| CH | 582034 A5 | 11/1976 |
| DE | 3231942 A1 | 6/1983 |
| EP | 1055471 A1 | 11/2000 |

* cited by examiner

*Primary Examiner* — Alan Snyder
(74) *Attorney, Agent, or Firm* — Laubscher & Laubsher, P.C.

(57) ABSTRACT

A device and method for recovering and unloading bar crop ends is suitable for use with a loading apparatus for supplying bars to a machine tool. The devices includes a grasping element suitable for engaging a bar-pushing unit of the loading apparatus and a bar crop-end to be taken and unloaded. A slide element receives and conveys the bar crop ends to a collecting zone. A supporting and transferring unit transfers the grasping element from an upper position, in which it is axially aligned on the advancement trajectory of the bar-pushing unit, to a lower position in which it is near the slide element. The device further includes an ejecting unit that is drivable for penetrating the grasping element in the lower position to eject the crop end and sending the crop end, by the slide element, to the collecting zone.
A method is also disclosed for recovering and unloading bar crop ends from a machine tool.

11 Claims, 8 Drawing Sheets

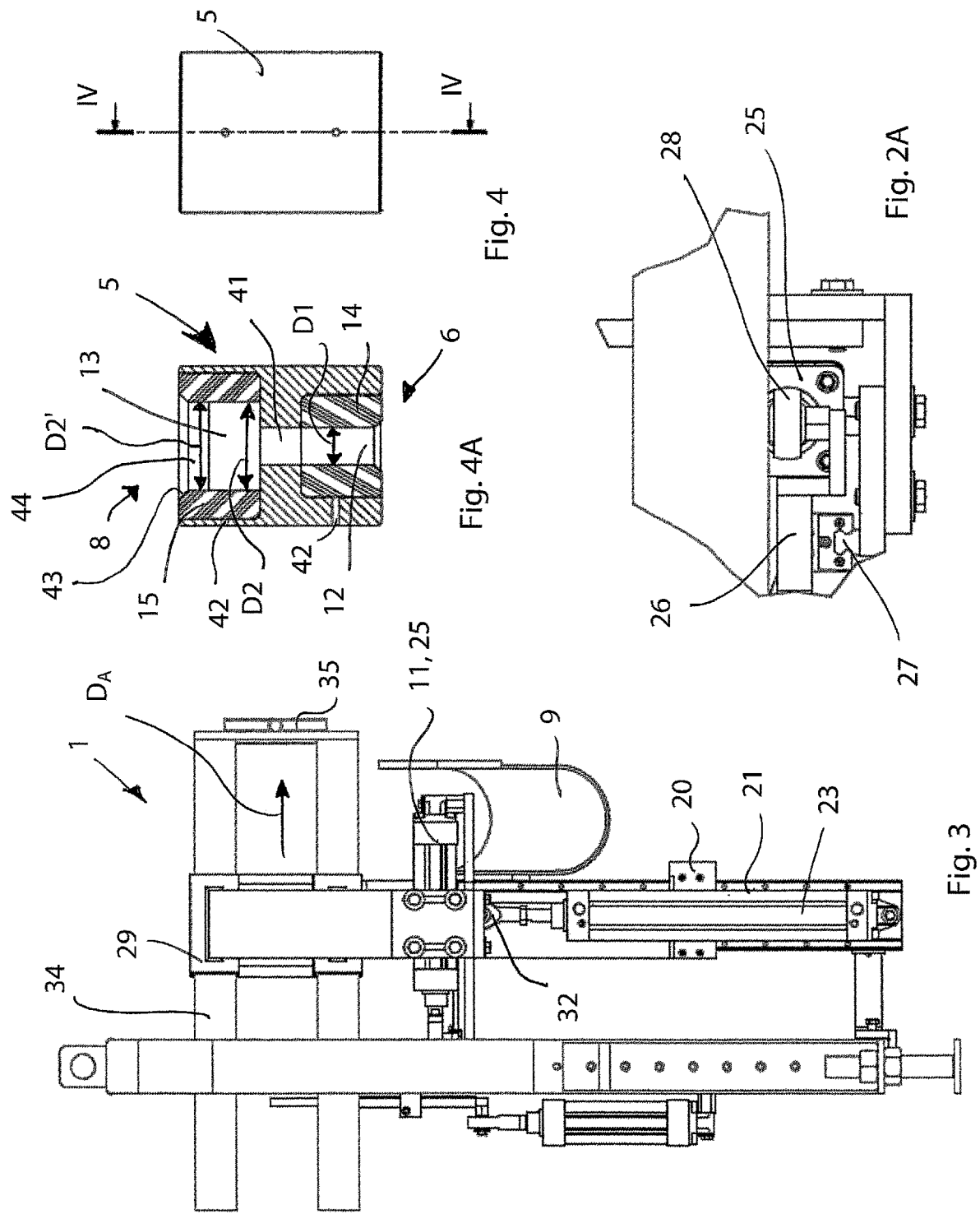

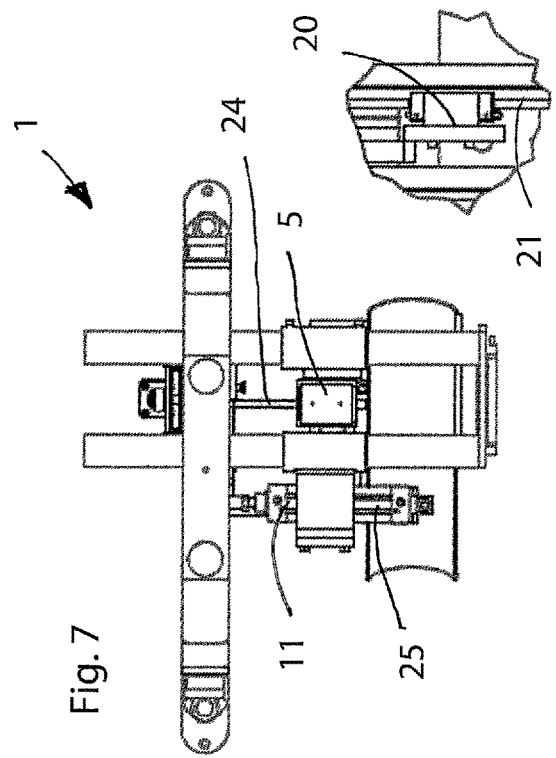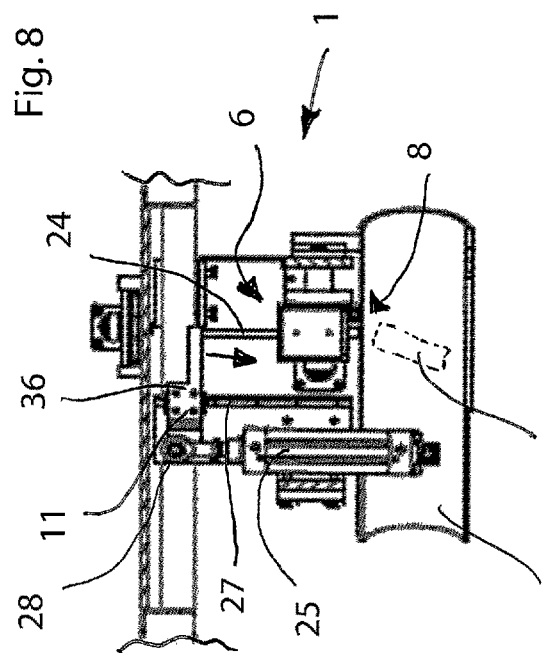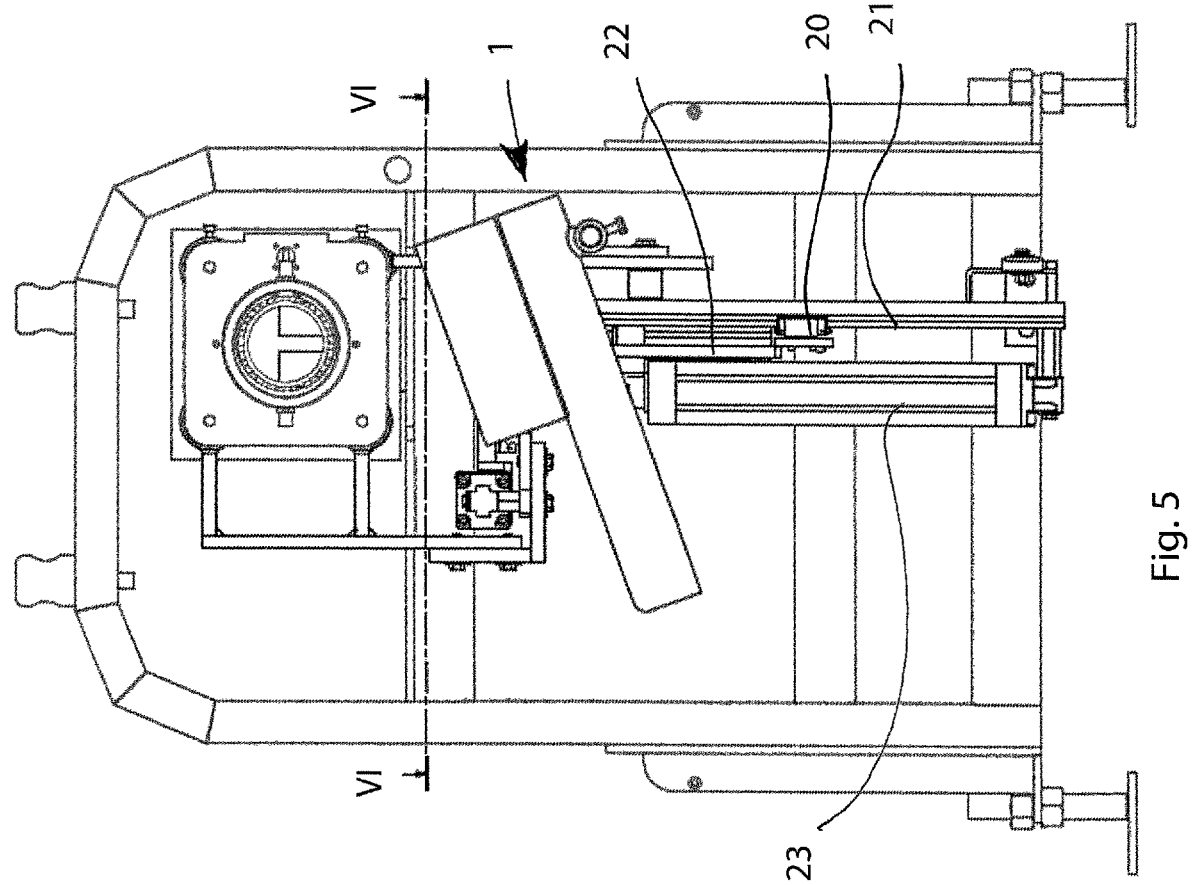

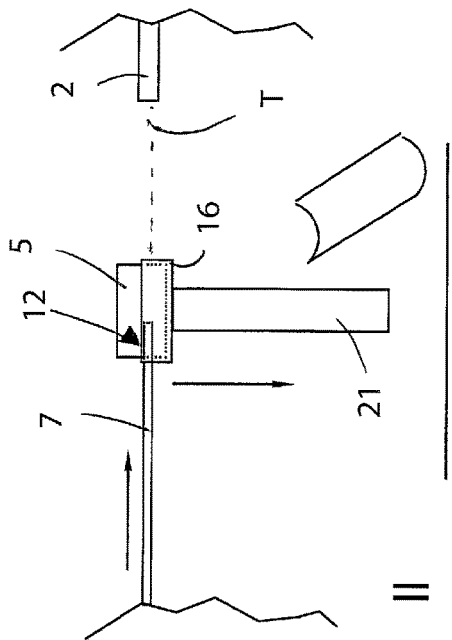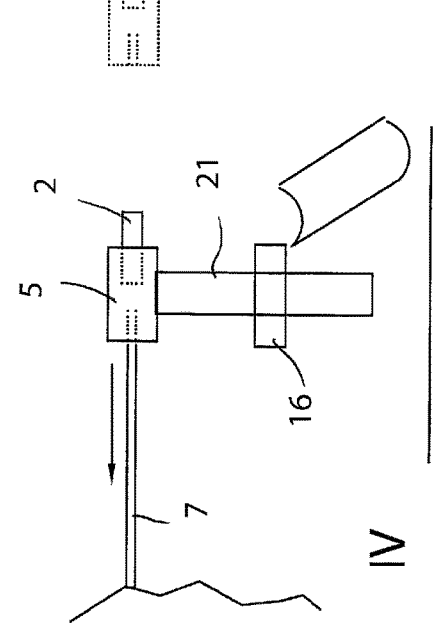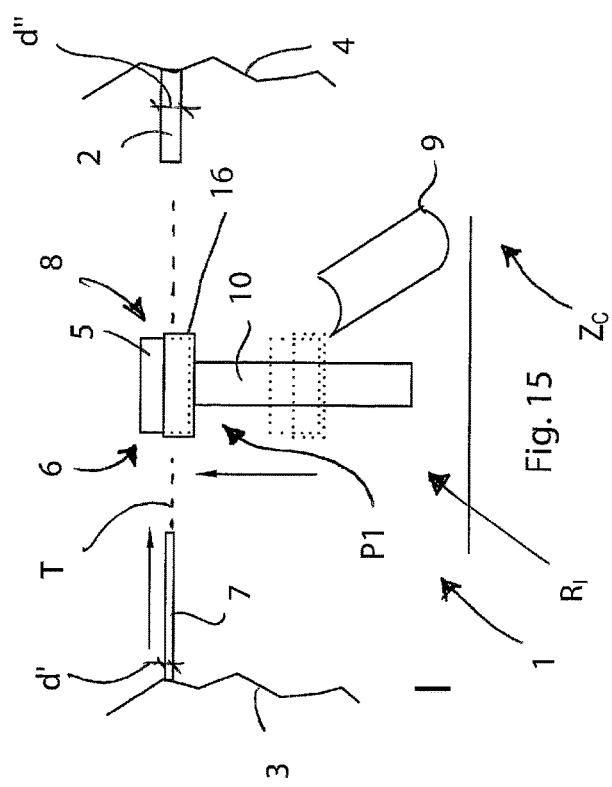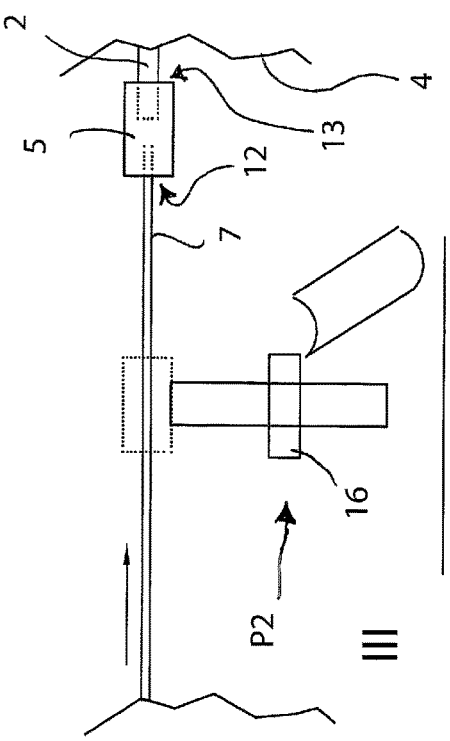

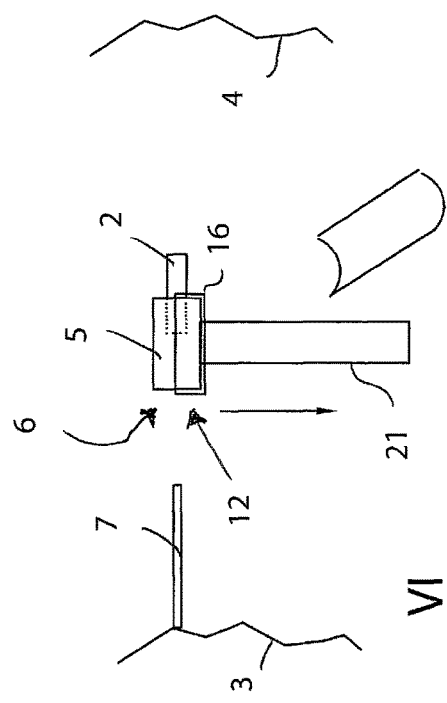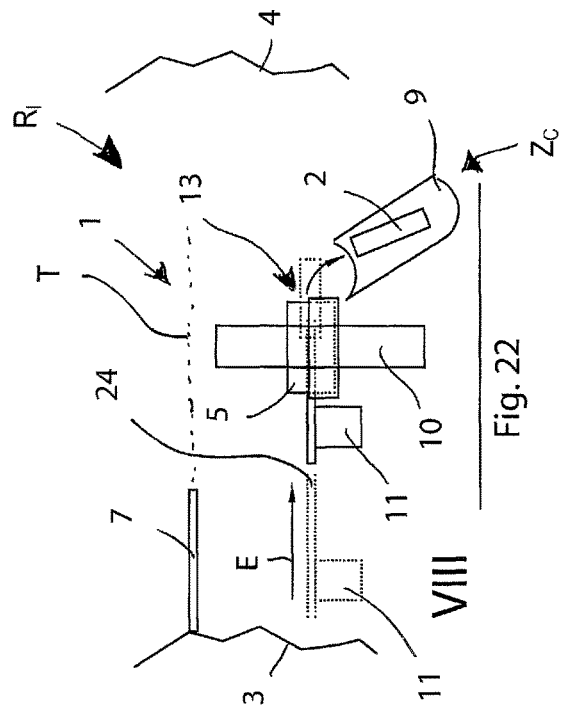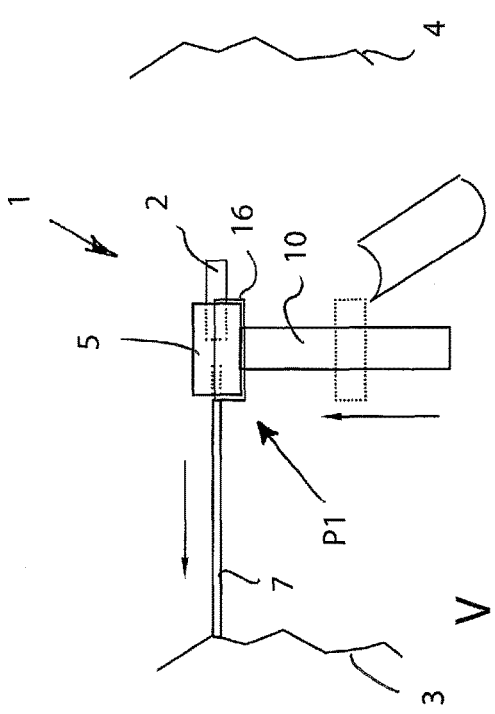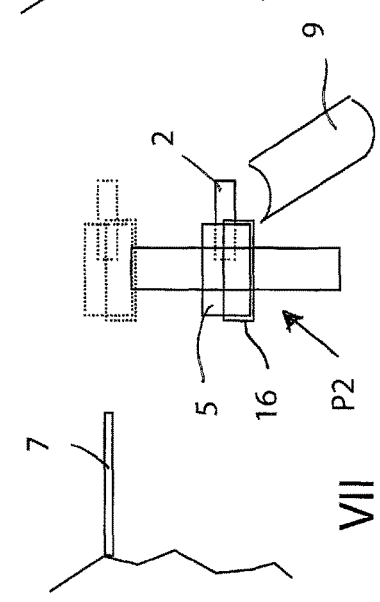

DEVICE AND METHOD FOR RECOVERING AND UNLOADING BAR CROP ENDS FROM A MACHINE TOOL

CROSS-REFERENCE TO RELATED APPLICATIONS

This application is a § 371 National Stage Entry PCT/EP2016/078573 filed Nov. 23, 2016. PCT/EP2016/078573 claims priority of IT-UB2015A005834 filed Nov. 24, 2015. The entire content of these applications are incorporated herein by reference.

BACKGROUND OF THE INVENTION

The present invention relates to a device for recovering and unloading bar crop ends, the residual parts at the end of machining bars supplied by a loading apparatus to a machine tool, such as an automatic lathe.

In the field of machining bars by a lathe, it is known to use loading apparatuses that automatically and progressively supply a bar to respective spindle of the aforesaid lathe. One type of loading or supplying apparatus has a bar pusher that acts to make the bar advance progressively by successive steps through the machining station or stations of the lathe. The rear end of the bar is temporarily integral with the bar pusher by a mechanical coupling. Once machining of the bar has terminated, the rear end of the latter constitutes the residual crop end of machining that has to be evacuated from the lathe. At this point, the bar pusher is retracted until it brings back and releases what remains of the bar, i.e. the crop end, inside the loading apparatus. Although the loading apparatus disclosed above operates reliably, it is strongly desired to dispose of a more versatile technical solution that whilst ensuring very reduced overall dimensions and a simple and cheap structural configuration, makes it possible to recover effectively the bar crop ends to unload into a different desired collecting zone, thus eliminating the constriction of having to necessarily transfer the bar crop ends inside the loading apparatus.

One object of the present invention is to provide a solution that is able to simplify and improve in general the processes for machining the bars on machine tools and in particular recovering and unloading the bar crop ends left after machining.

Another object is to provide a device for recovering and unloading bar crop ends that is very versatile, that has a cheap, simplified structural configuration that is able to be applied easily and is adaptable to known loading apparatuses that are already in use.

Another object is to provide a device for recovering and unloading bar crop ends that have very small overall dimensions, both transversely and longitudinally, with respect to the bar advancement trajectory.

Owing to the invention, the drawbacks are overcome that are inherent in known systems for supplying bars and recovering the corresponding bar crop ends left from the machining process.

Features and advantages of the invention will be clear from the claims and from the description.

BRIEF DESCRIPTION OF THE DRAWINGS

The invention can be understood better and implemented with reference to the attached drawings, which illustrate an embodiment thereof by way of non-limiting example, in which:

FIGS. 2 and 3 are respectively a rear view and a side view of the set of FIG. 1;

FIG. 2A shows an enlarged detail of FIG. 2;

FIG. 4 shows a grasping element included in the device for recovering and unloading bar crop ends according to the invention;

FIG. 4A is a longitudinal section of the grasping element, taken along the plane IV-IV in FIG. 4;

FIG. 5 is a front view of the assembly of FIG. 1;

FIG. 6 is a fragmentary and section view taken along the plane VI-VI in FIG. 5;

FIG. 7 is a top view of the device for recovering and unloading bar crop ends;

FIG. 8 shows an enlarged detail of FIG. 5;

FIGS. 15 to 22 show schematically in sequence different operating steps of the device for recovering and unloading bar crop ends according to the invention.

DETAILED DESCRIPTION

Figure 2:
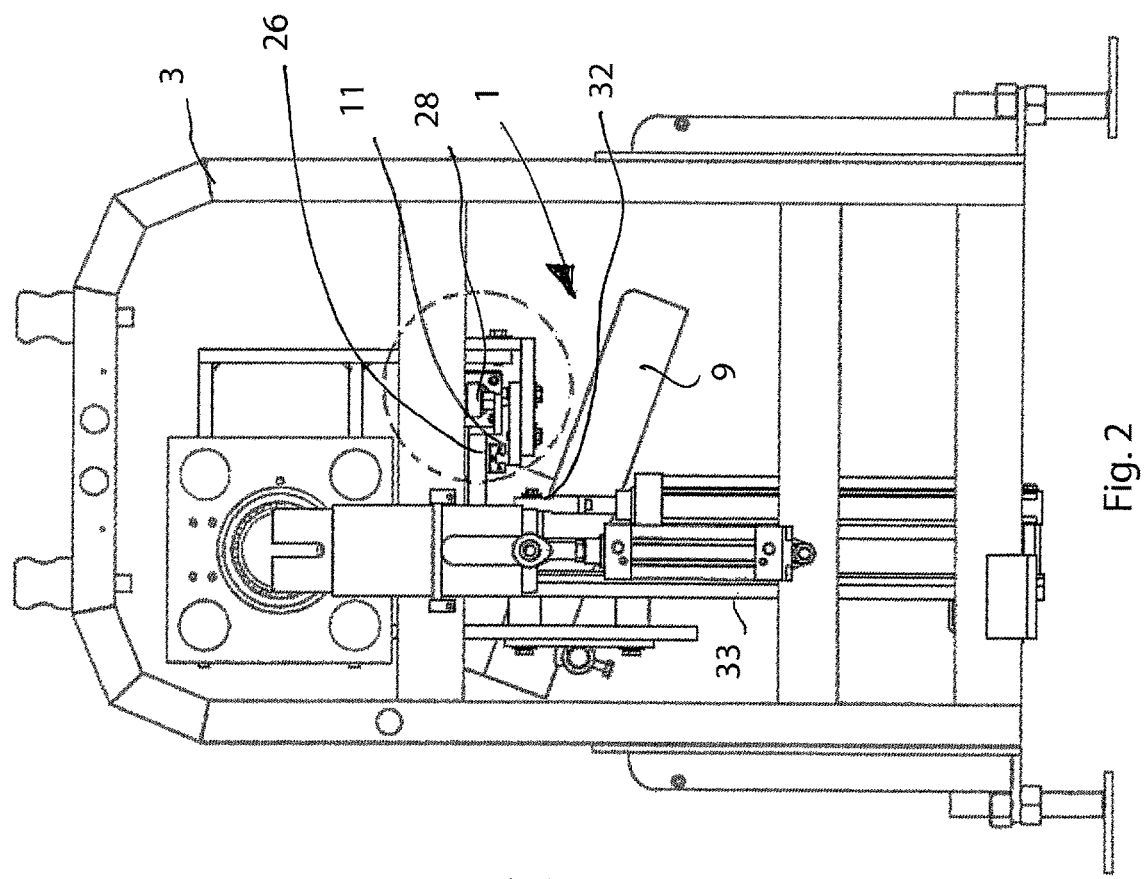
Figure 1:
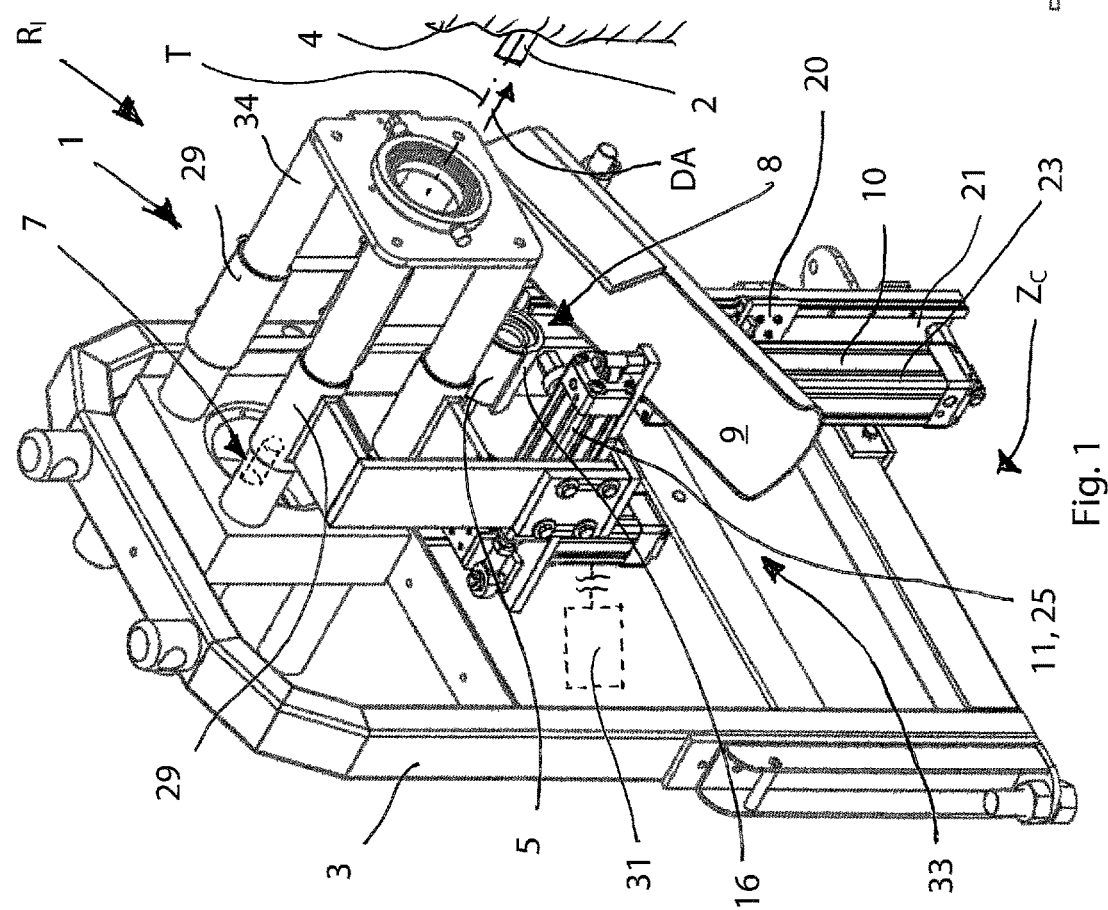
FIG. 1 is a perspective view that shows the device for recovering and unloading bar crop ends according to the invention, applied to a loading apparatus only a part of which is shown.
Figure 9:
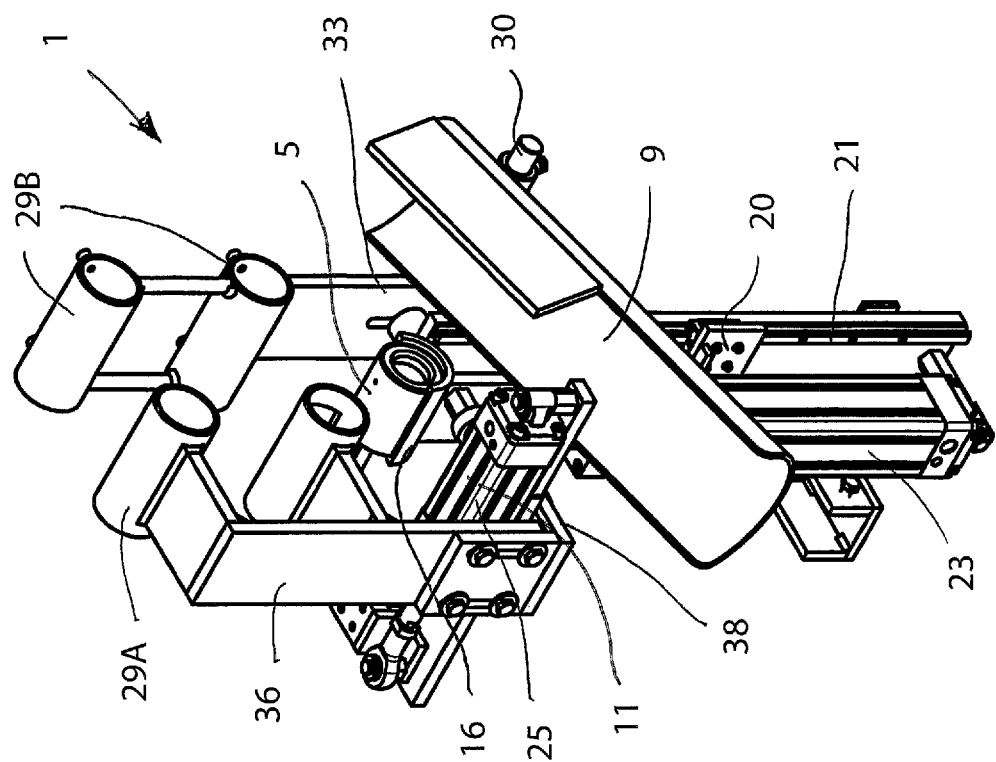
FIGS. 9 to 12 are further views of only the device for recovering and unloading bar crop ends.
Figure 10:
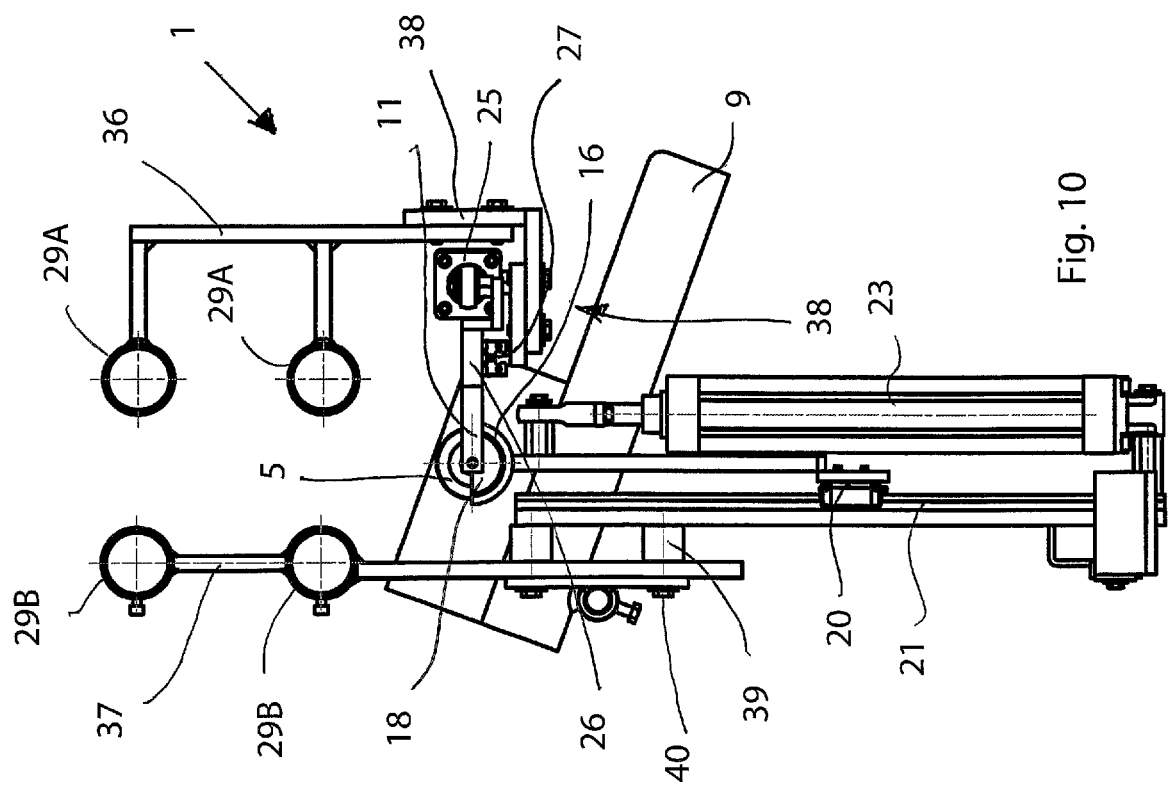
Figure 12:
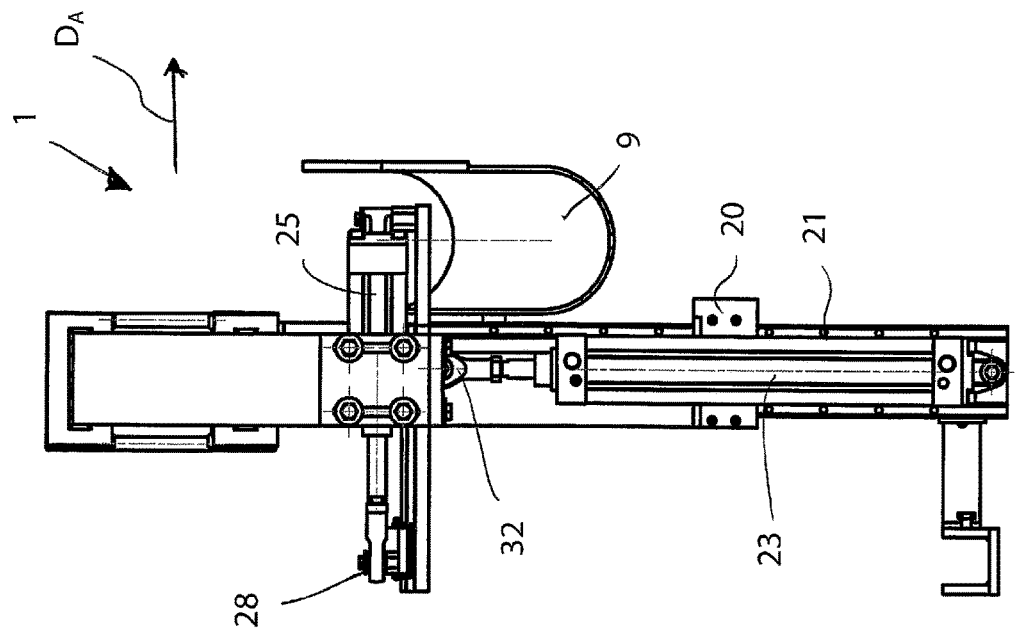
Figure 11:
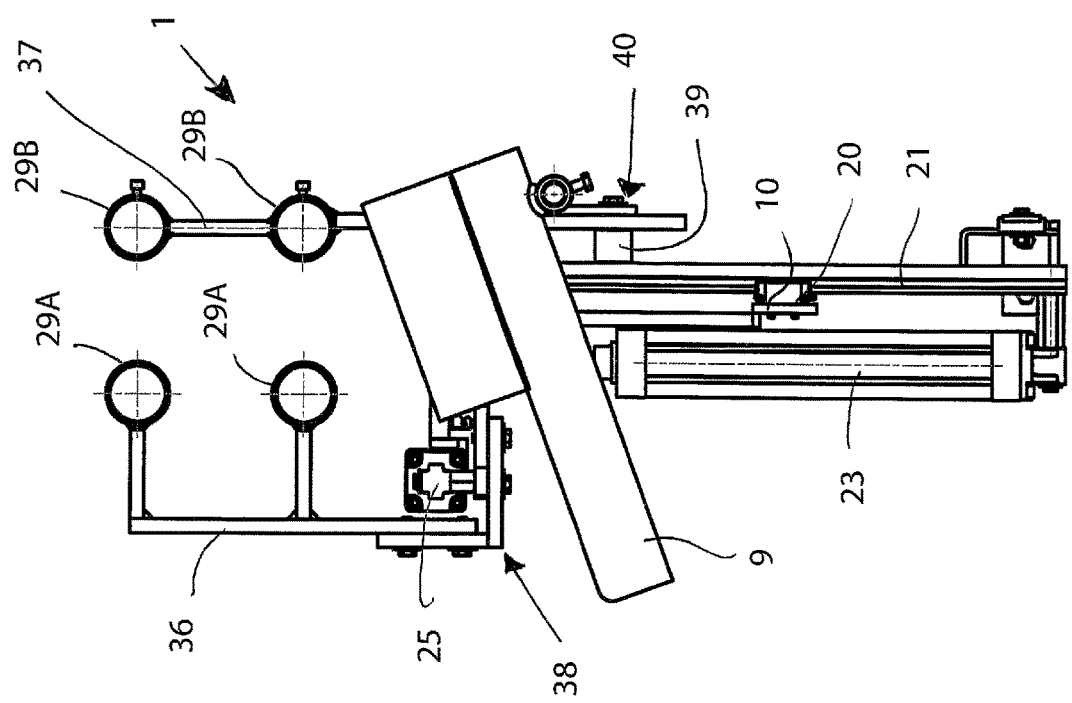

With reference to the attached figures, a device 1 is shown for recovering and unloading bar crop ends 2, which is suitable for being applied to a loading apparatus 3 for automatic supplying of the bars to a machine tool 4, in particular to a lathe 4 that can be of the single spindle or of the multi-spindle type. The recovery and unloading device 1 is configured for being interposed between the loading apparatus 3 and the lathe 4. In particular, the recovery and unloading device 1 has a support structure 33 that is mounted on the end of the loading apparatus 3 from which the bars come out, so as to be thus positioned downstream of the loading apparatus 3 but upstream of the lathe 4, with respect to a supplying direction $D_A$ of the bar to the latter. Between the loading apparatus 3 and the machine tool 4 an intermediate operating region $R_1$ is thus defined for removing, withdrawing and unloading bar crop ends 2.

The support structure 33 of the device 1 comprises mounting brackets 29, having a sleeve shape, by which mounting brackets 29 the connection of the recovery-unloading device 1 to the loading apparatus 3 is possible, more precisely to front tubular bars 34 that support a centring mechanism 35 for the bars during supplying. The mounting brackets 29, owing to the sleeve conformation, enable the position of the device 1 to be adjusted in a longitudinal direction with respect to the loading apparatus 3 and to the machine tool 4. The support structure 33 is further shaped to enable the position of the device 1 to be adjusted in a direction that is transverse with respect to a trajectory T of advancement and supplying of the bars. In particular, the position of the device 1 is adjustable also in height, i.e. vertically, in order to be able to adapt to the geometry of the loading apparatus 3 and of the lathe 4. More precisely, a first pair of brackets 29A and a second pair of brackets 29B are provided, fixed respectively to a first plate 36 and second plate 37. The first plate 36 is connected to the support structure by square bracket elements 38 that enable the vertical and horizontal position of the first pair of brackets 29A to be adjusted, orthogonally to the bar advancement direction. The second plate 37 is connected to the support structure 33 by a spacer element 39 that enables the horizontal position thereof to be adjusted. Further, a fixing element 40 is provided that comprises screw elements engaging in suitably shaped slot openings, that enable the vertical position of the second plate 37 and thus of the second pair of brackets 29B to be adjusted.

In the recovery-unloading device 1 a grasping element 5 is also included that acts as a gripper for removing, moving and releasing a crop end 2.

The grasping element 5 is suitable for engaging both a rear end of the crop end 2 to be recovered and a front end of the bar-pushing unit 7.

The recovery-unloading device 1 further comprises a movable supporting and transferring unit 10, 16 suitable for supporting and transferring to determined positions, (disclosed better below) the aforesaid grasping element 5, and an ejecting unit 11 that acts to expel the respective crop end 2 from the grasping element 5, and send the crop end 2 to a slide element 9 that conveys the crop end 2 to a collecting zone Zc. The aforementioned parts of the recovery-unloading device 1 for bar crop ends 2 are better disclosed below.

The grasping element 5, shown better in FIGS. 4 and 4A, comprises a tubular bush body 5 in which are obtained a first seat 12, suitable for receiving and engaging the bar-pushing unit 7, and a second seat 13 suitable for receiving and engaging the crop end 2. The bar-pushing unit 7 can penetrate the first seat 12 through a first end 6 of the grasping element 5, whereas the crop end 2 is received in the second seat 13 through a second end 8 of the grasping element 5 opposite the first end 6.

In the tubular bush body 5 there is longitudinally obtained a through passage opening 41 that connects and places in communication the first seat 12 with the second seat 13. The through passage opening 41 is shaped to enable the ejecting unit 11, in particular a thrusting shaft 24 thereof, to penetrate—traversing the first seat 12 and thus the through passage opening 41—in the second seat 13 so as to be able to push the crop end 2 out from the grasping element 5, and expel the crop end 2 to the slide element 9.

The first seat 12 and the second seat 13 are made of a promoting adhesion material arranged for ensuring firm grasping action of the crop end 2 and a stable releasable coupling of the grasping element 5 with the bar-pushing unit 7. In particular, the grasping element 5 includes two rubber inserts 14, 15 in which respectively the aforesaid first 12 and second 13 seat are obtained. The first seat 12 has a first inner diameter D1 that is about equal to the diameter of the bar-pushing unit 7, whereas the second seat 13 has a second diameter D2 that is about equal to the respective diameter d" of the crop end 2.

More precisely, the insert 15 comprises, near the second end 8, a thicker annular portion 44, having a further inner diameter D2' that is slightly less than the aforesaid second diameter D2. In particular, but not in a limiting manner, the further diameter D2' is smaller than the second diameter D2 by about 0.3 millimetres. The thickened portion 44, has the function of compensating for and contrasting possible bellying or deforming actions suffered by the insert 15 because of the cyclical coupling thereof with the crop end 2.

On the insert 15 a bevelled receiving zone 43 is also provided, to facilitate the receipt of the crop end 2 in the second seat 13.

Owing to the rubber material of which the inserts 14, 15 are made, a reliable gripping action is obtained easily and effectively, with a grip of the crop end 2 and also a firm coupling with a strong grip between the grasping element 5 and bar-pushing unit 7.

Owing to the simple but effective structural configuration of the grasping element 5, the recovery-unloading device 1 is able to adapt with significant easiness to the dimensions and geometries of the crop end 2 and of the bar-pushing unit 6. This is achievable by simply replacing the grasping element 5 with another that is similar thereto but has different geometries/dimensions of the seats 12 and 13.

In the embodiment disclosed here, the rubber inserts 14, 15, are moulded directly inside the tubular body 5. For this purpose, on the tubular body 5 vent holes 42 are provided to enable air/gas to be evacuated during the operation of moulding the aforesaid inserts 14 and 15.

In a possible further embodiment, the inserts 14 and 15 are fixed to the tubular body 5 by suitable fixing elements engaging through holes obtained in the thickness of the tubular body 5. This configuration also makes the replaceability of only the inserts 14, 15 in the tubular body 5 possible, to adapt to different diameters of the crop end 2 and/or of the bar-pushing unit 7, avoiding the necessity of replacing the entire grasping element 5. It is possible to dispose of only one tubular body 5 and of one set of inserts 14, 15, of various dimensions that are suitable for various sizes of bar or different geometries of the bar-pushing unit 7.

The movable supporting and transferring unit 10, 16 is now described in greater detail that is used to support the grasping element 5, and is movable for transferring the latter from an upper position P1, in which the grasping element 5 is axially aligned on the advancement trajectory T of the bar-pushing unit 7, thus of the bar being supplied, to a lower position P2 in which the grasping element 5 is placed near the aforementioned slide element 9.

Figure 13:
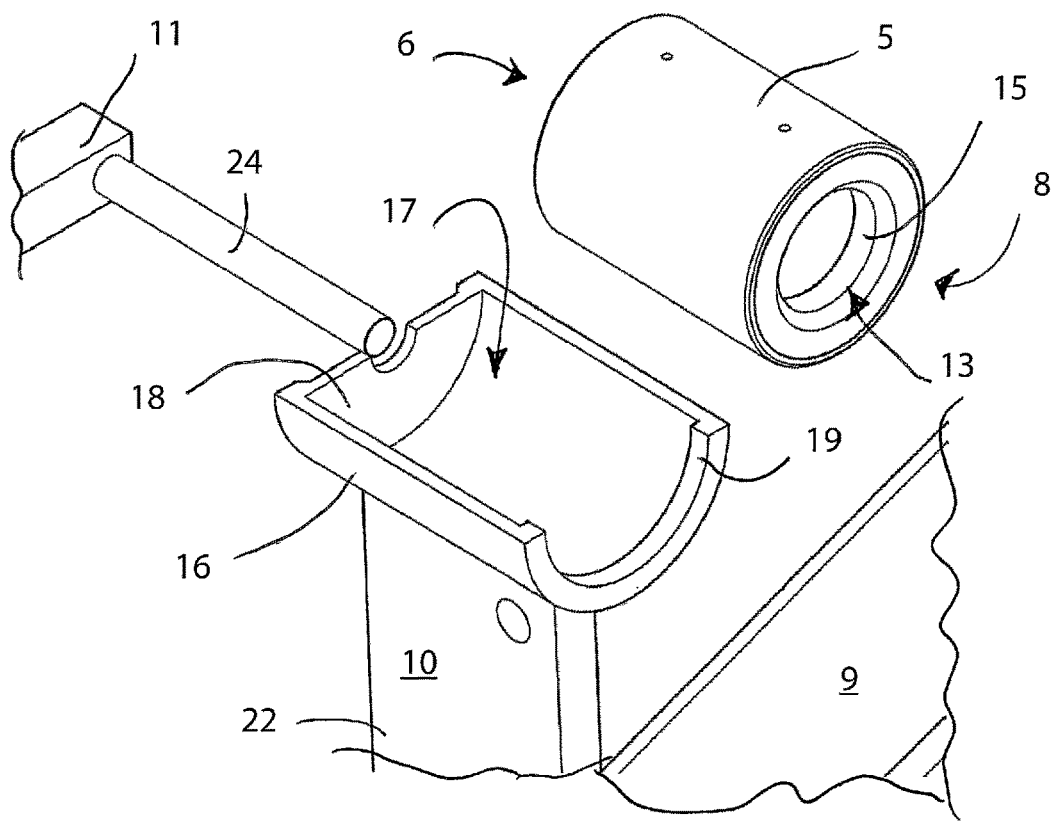
FIGS. 13 and 14 show in greater detail some parts of the device for recovering and unloading bar crop ends, in particular a support-transfer unit and the grasping element, respectively in two different reciprocal positions.
Figure 14:
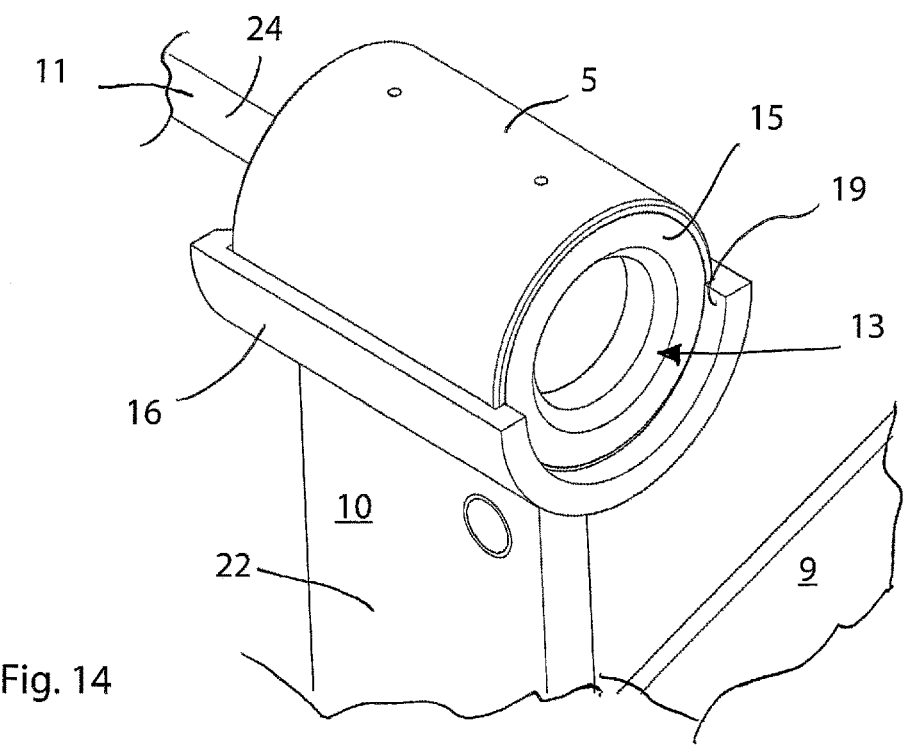

The movable supporting and transferring unit 10 comprises a cup element 16 (shown better in FIGS. 13 and 14), in which a housing semi-cylindrical seat 17 for the grasping element 5 is defined. The cup element 16 comprises, at a first end intended, during operation, for facing the loading apparatus 3, an abutting wall 18 that projects transversely to bound the aforesaid semicylindrical seat 17. The abutting wall 18 is shaped for restingly receiving the first end 6 of the grasping element 5, so as to enable the cup element 16 to be positioned precisely and correctly in the semicylindrical seat 17. Naturally, the height and/or geometrical shape of the abutting wall 18 is chosen in such a manner that in the upper position P1 it does not hinder the coupling operation of the bar-pushing unit 7 with the grasping element 5. For example, on the upper edge of the abutting wall 18 a suitable notch or break can be made to prevent interference with the travel of the bar-pushing unit 7.

The cup element 16 comprises, at a second end intended for facing, during operation, the lathe 4, a raised edge portion 19, arranged for retaining the grasping element 5 in a correct position in the housing semi-cylindrical seat 17. The raised edge portion 19 has the function of preventing the grasping element 5, when it is in the upper position P1, from being able to fall from the cup element 16 during coupling of the bar-pushing unit 7 with the grasping element 5. Further, the raised edge portion 19 has the function of preventing the grasping element 5, when it is in the lower position P2, from being able to fall from the cup element 16 during the action of ejection of the crop end 2 performed by the ejecting unit 11, 24.

The movable supporting and transferring unit 10 comprises a slide 20 that is slidable along a vertical guide 21. To the slide 20 an arm member 22 is fixed that supports the cup element 16. A driving piston 23 is provided that is connected by an articulated joint 32 to the aforesaid slide 20 and arranged for moving the latter so as to transfer the cup element 16 from the aforesaid upper position P1 to the aforesaid lower position P2 and vice versa.

The aforementioned ejecting unit 11 comprises a carriage 26 to which the thrusting shaft 24 is fixed that is slidable along a horizontal guide 27 so as to move the thrusting shaft 24 along an ejection direction E that is parallel to the advancement trajectory T located above. The carriage 26 is connected by an articulated joint 28 to a driving cylinder unit 25. Owing to the cylinder unit 25, the thrusting shaft 24 is moved forwards to penetrate the grasping element 5 and eject the crop end 2, and backwards to disengage from the grasping element 5, permitting subsequent lifting thereof to the upper position P1.

The slide element 9, for receiving and conveying the crop end 2 to the collecting zone Zc, is connected to the support structure 33 by a bar element 30. The connection of the slide element 9 to the bar element 30 is of adjustable type, such as to make possible to choose a suitable and desired position and tilt of the slide element 9. In particular, owing to the bar element 30, it is possible to adjust both the longitudinal position and the tilt of the slide element 9.

The recovery-unloading device 1 further comprises a control and synchronising unit 31 configured for controlling the supporting and transferring unit 10 in a manner synchronised with the bar-pushing unit 7, and in turn for controlling the ejecting unit 11 in a synchronised manner with the supporting and transferring unit 10.

With reference to FIGS. 15 to 22, it is briefly disclosed below the operation of the recovery-unloading device 1 according to the invention disclosed above.

Once the lathe 4 has finished processing the bar that is now reduced to a crop end 2, the recovery and unloading device 1 can intervene.

In step I, shown in FIG. 15, the grasping element 5 is lifted vertically from the cup element 16 to the position P1, so as to be ready to be engaged by bar-pushing unit 7.

In Step II (shown in FIG. 16) the bar-pushing unit 7 engages the grasping element 5, after which the cup element 16 can be again lowered so as not to hinder the advancement of the grasping element 5, supported by the bar-pushing unit 7, to the lathe 4 from which the crop end 2 in question has to be taken and recovered. In Step III (shown in FIG. 17), then, the bar-pushing unit 7 with the grasping element 5 reach the crop end 2 that is received in the second seat 13 of the grasping element 5, remaining thus stably grasped to the latter owing to the elastic clamping action with grip performed by the insert 15. At this point, the bar-pushing unit 7 is retracted, taking with it the grasping element 5 and the crop end 2 to the upper position P1 (step IV shown in FIG. 18). Subsequently, in Step V shown in FIG. 19, the cup element 19 is again lifted to the upper position P1 to receive in the semi-cylindrical seat 17 thereof the grasping element 5 bearing the crop end 2. The bar-pushing unit 7 can be retracted or disengaged from the first seat 12 of the grasping element 5, leaving the latter on the cup element 16. In Step VI (shown in FIG. 20), the supporting and transferring unit 10 is again driven to lower the cup element 16, and thus the grasping element 5 joined to the crop end 2, in the lower position P2, thus reaching the subsequent step VII (shown in FIG. 21) in which the crop end 2 is prepared to be ejected from the grasping element 5. At this point, the ejecting unit 11 is driven (step VIII in FIG. 22) and the thrusting shaft 24 penetrates into the first seat 12, traverses the through passage opening 41 emerges in the second seat 13 thus pushing the crop end 2 outside the grasping element 5. The crop end 2 then falls onto the slide element 9 that conveys the crop end 2 to the collecting zone Zc.

As can be understood from what has been disclosed above, the device 1 enables the objects to be reached that are stated above. In particular, the device 1, owing to the structural simplicity of the grasping element 5, of the supporting and transferring unit 10, of the ejecting unit 11 and of the slide element 9, is economical and provided with great mechanical reliability. The movable parts, owing to the very modest dimensions and weight, have reduced inertial mass, which enables the device 1 to work even at very high operational speeds, consequently enabling general speeding up of the entire machining cycle.

The simplified structural and functional configuration of the device 1 entails much reduced manufacturing and maintenance costs. The compact dimensions, the limited longitudinal extent of the device 1 and the possibility of a connection with adjustment of position, vertically, longitudinally and transversely with respect to the advancement trajectory of the bars, make the device 1 adaptable to any geometry of loading apparatus 2.

It is possible to configure and dimension the device 1 in a desired manner according to the application for which it may be intended and variations on and/or additions to what has been disclosed above and illustrated in the attached drawings are possible.

The invention claimed is:

1. A device for recovering and unloading crop-ends of bars, which is suitable for being applied to a loading apparatus for supplying said bars to a machine tool, comprising:
    a grasping element suitable for engaging, at a first end, a bar-pushing unit of said loading apparatus, and, at a second end, a crop-end to be taken and unloaded, said grasping element comprising a tubular bush body in which there are obtained a first seat for receiving and engaging said bar-pushing unit and a second seat for receiving and engaging said crop-end,
    a slide element for receiving and conveying said crop-end to a collecting zone;
    a supporting and transferring unit for said grasping element, said supporting and transferring unit being movable from an upper position, in which said grasping element is axially aligned on the advancement trajectory of said bar-pushing unit, to a lower position in which said grasping element is placed near said slide element, and
    an ejecting unit that is drivable for penetrating said grasping element placed in said lower position to eject from said grasping element said crop-end and send the crop-end to said slide element,
    in said tubular bush body there being longitudinally obtained a through passage opening that connects said first seat to said second seat, said through passage opening being shaped to enable said ejecting unit to penetrate, through said first seat, said second seat to eject said crop-end,
    said first seat and second seat being made of a adhesion promoting material arranged for ensuring firm grasping of said crop-end and stable coupling between said grasping element and said bar-pushing unit.

2. A device according to claim 1 wherein said grasping element includes a first rubber insert and a second rubber insert in which said first and second seats are respectively obtained, said first seat having a first inner diameter that is adaptable to the diameter of said bar-pushing unit and said second seat having, in a more internal zone, a second diameter that is adaptable to the diameter of said crop-end, said second insert comprising, near the second end, a thicker annular portion, having a further inner diameter that is less than said second diameter, suitable for compensating for and contrasting deformation due to coupling with said crop-end.

3. A device according to claim 1, wherein said supporting and transferring unit comprises a cup element in which a housing semi-cylindrical seat for housing said grasping element is defined, said cup element comprising, at a first end intended for facing said loading apparatus, an abutting wall that projects transversely to bound said semicylindrical seat and is shaped for restingly receiving said first end of said grasping element.

4. A device according to claim 3, wherein said cup element comprises, at a second end intended for facing said machine tool, a raised edge portion, arranged for retaining said grasping element in a correct position in said housing semicylindrical seat and preventing a corresponding relative movement of said grasping element with respect to said cup element.

5. A device according to claim 3, wherein said supporting and transferring unit comprises a slide slidable along a vertical guide, to said slide an arm member being fixed that supports said cup element, a driving piston being also provided that is arranged for moving said slide so as to transfer said cup element from said upper position to said lower position and vice versa.

6. A device according to claim 1, wherein said ejecting unit comprises a thrusting shaft drivable by a cylinder unit and movable along an ejection direction parallel to said advancement trajectory.

7. A device according to claim 6, wherein said ejecting unit comprises a carriage to which said thrusting shaft is fixed, that is slidable along a horizontal guide, and connected to said cylinder unit by an articulated joint.

8. A device according to claim 1, further comprising mounting brackets that are suitable for connecting said recovering-unloading device to said loading apparatus in an intermediate operating region interposed between said loading apparatus and an end of said machine tool for the entry of the bars, said mounting brackets being configured for enabling the position of said recovering-unloading device to be adjusted both vertically and longitudinally with respect to said loading apparatus and to said machine tool.

9. A device according to claim 1, further comprising a bar element for supporting said slide element in an adjustable manner so as to be able to set for the latter a desired position and tilt according to the required collecting zone.

10. A device according to claim 1, and further comprising a control and synchronising unit configured for controlling said supporting and transferring unit in a synchronised manner with said bar-pushing unit, and for controlling said ejecting unit in a synchronised manner with said supporting and transferring unit.

11. A plant comprising a bar loading apparatus and a recovering-unloading device according to claim 1.

* * * * *